March 8, 1938.  W. H. DE LANCEY  2,110,326
HOSE NOZZLE
Filed Sept. 4, 1936   2 Sheets-Sheet 1
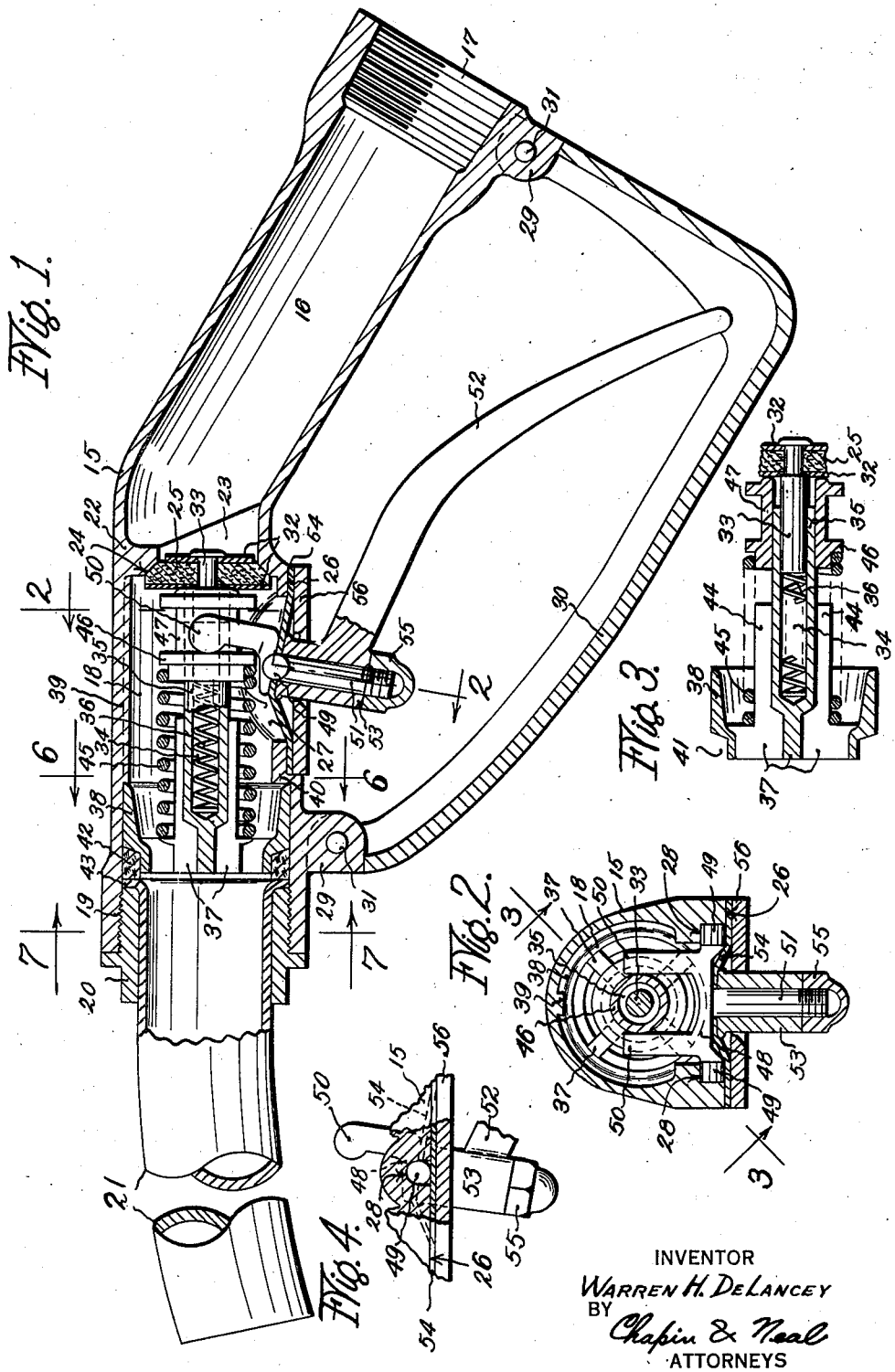
INVENTOR
Warren H. DeLancey
BY
Chapin & Neal
ATTORNEYS March 8, 1938. W. H. DE LANCEY 2,110,326
HOSE NOZZLE
Filed Sept. 4, 1936 2 Sheets-Sheet 2
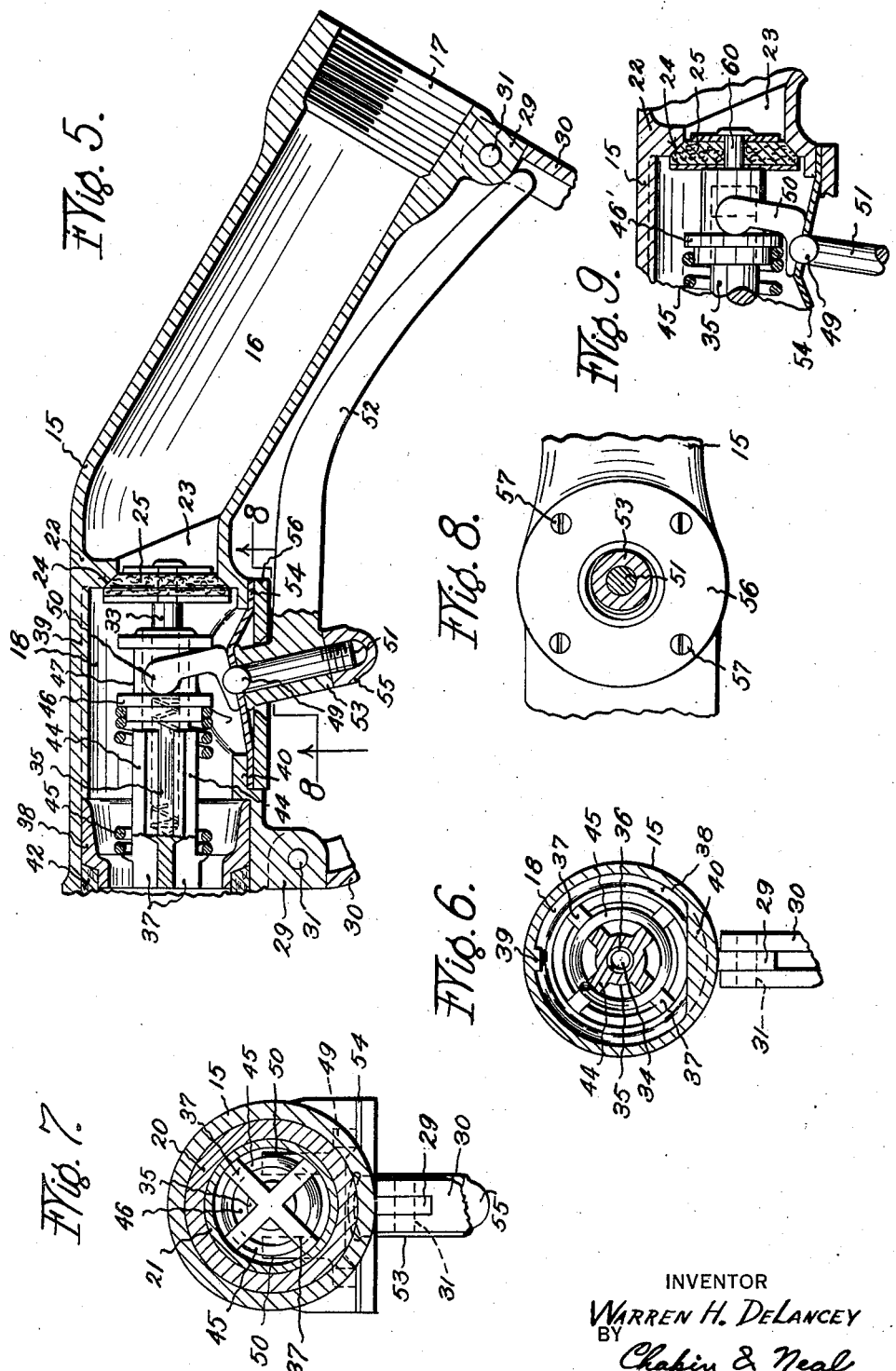
INVENTOR
Warren H. DeLancey
BY
Chapin & Neal
ATTORNEYS Patented Mar. 8, 1938

2,110,326

UNITED STATES PATENT OFFICE 2,110,326

HOSE NOZZLE

Warren H. De Lancey, West Springfield, Mass., assignor to Gilbert & Barker Manufacturing Company, West Springfield, Mass., a corporation of Massachusetts Application September 4, 1936, Serial No. 99,374

7 Claims. (Cl. 251—134)

This invention relates to an improved hose nozzle and, more particularly, to a nozzle of a type suitable for use on the delivery hose of gasoline dispensing apparatus.

The conventional form of hose nozzle, now in general use, embodies a valve which automatically closes by a heavy spring and which is held closed by such spring plus the pressure of the liquid in the inlet passage of the hose nozzle. The valve is opened manually by a pivoted hand lever which acts on the stem of the valve,—such stem passing through a stuffing box in the body of the nozzle. The valves of these nozzles require considerable effort to open them against the combined pressure of the liquid and the spring and they are not easily controlled (that is it is difficult to secure small openings of the valve) and they are not smooth in operation. Also, the stuffing boxes of these nozzles are liable to leak and they require constant adjustment to avoid leakage.

This invention has for an object the provision of an improved hose nozzle construction wherein the objectionable features, above referred to, are overcome.

More particularly, the invention has for an object to provide in a valved hose nozzle, an actuating lever for operating the valve and a diaphragm connected with the lever and the nozzle body for providing a seal against leakage, which seal does not require adjustment to maintain it leak-proof.

Another object of the invention is to provide an improved arrangement whereby the valve and all its associated parts may be conveniently assembled from the outlet end of the nozzle body.

Another object of the invention is to provide in a hose nozzle a member which is separable from the nozzle body for supporting and guiding the nozzle valve, and to provide an arrangement whereby this member may be clamped in position in the nozzle body by the same means employed for fastening the nozzle tube or spout thereto.

A further object is to provide a generally improved nozzle construction which is designed to effect substantial savings in manufacturing cost.

Other objects will appear as the detailed description proceeds and will be pointed out in the appended claims.

The invention will be disclosed with reference to the accompanying drawings, in which:

Fig. 1 is a sectional elevational view of a hose nozzle embodying the invention;

Fig. 2 is a cross sectional view thereof, taken on the line 2—2 of Fig. 1;

Fig. 3 is a sectional view of the valve support and valve, shown apart from the nozzle and taken on the line 3—3 of Fig. 2;

Fig. 4 is a fragmentary, exterior elevational view of the nozzle body with parts in section to show the trunnion seats;

Fig. 5 is a fragmentary view taken similarly to Fig. 1 but showing the movable parts in different relative positions;

Figs. 6 and 7 are cross sectional views taken on the lines 6—6 and 7—7, respectively, of Fig. 1;

Fig. 8 is a fragmentary sectional bottom plan view taken on the line 8—8 of Fig. 5; and Fig. 9 is a fragmentary sectional elevational view showing a modification in the mounting of the nozzle valve.

Referring to these drawings; the nozzle includes a body member 15 (Fig. 1) in the form of a hollow casing. This member may be advantageously formed by die casting and, for the sake of lightness, it is preferably formed of some metal such as aluminum. The member 15 has a cylindrical inlet passage 16 threaded at its outer end, as at 17, for attachment to a hose, and an outlet passage 18, threaded at its outer end as at 19, to receive an annular nut 20 by means of which the nozzle tube or spout 21 is secured to the nozzle body in open communication with the outlet passage 18. The inner ends of the inlet and outlet passages are coaxial and are separated by a partition 22, having an opening 23 therethrough located coaxially with the adjacent ends of the two passages and having on the outlet side thereof a seat 24 for the nozzle valve 25. The major portion of the inlet passage is, for convenience, bent at a small angle to the outlet passage as shown.

The nozzle body, at a location intermediate the ends of the outlet passage, is built out into the cross sectional shape shown in Fig. 2, providing a flat lower face 26 through which a cylindrical hole 27 extends to intersect at right angles with the outlet passage 18. Extending inwardly from the face 26 and located at diametrically opposite points in the wall of hole 27 are U-shaped trunnion seats 28 (see also Fig. 4), the semi-cylindrical portions of these seats being innermost as shown. These aligned seats have their common axis located at right angles to and below the axis of the valve.

The nozzle body, on its lower part, is provided with depending lugs 29, one near each end thereof, to receive the forked ends of the usual guard 30 for the valve operating lever. The guard is secured to these lugs by pins or rivets 31.

The nozzle valve 25 is secured as indicated in Fig. 1 between two washers 32, to a short cylindrical stem 33. This stem is slidable in the direction of the axis of the valve in the bore 34 of a sleeve 35. A relatively light spring 36, located in said bore, acts between the outer and closed end of the sleeve and the inner end of stem 33 to hold the valve 25 against its seat 24. The sleeve 35, near its outer end, is connected by four radial webs 37 to an annular ring 38,—these several elements being integral parts of one die-casting. This ring closely fits the bore of outlet passage 18 and is inserted from the outer end of such passage prior to the assembly of the nozzle tube 21. The wall of outlet passage is shouldered, as at 39 and 40 (see also Fig. 6), to provide seats against which the inner end of ring 38 abuts. The outer end of ring 38 is recessed as at 41 (Fig. 3) to receive a cork gasket 42. The nozzle tube 21 has on its inner end a flange 43 and the nut 20 forces this flange against the gasket and the ring 38 against its seats 39 and 40. The webs 37 have integral parts 44 which extend along the sleeve 35, as best shown in Fig. 3, and fit inside and support the main and relatively strong valve spring 45.

This valve spring 45, as shown, acts on valve 25 through the intermediary of a collar 46 which is slidably mounted on the sleeve 35. The fins 44, as shown in Fig. 3, stop short of the end of the sleeve to allow the collar to move throughout the necessary range. It is not intended to have the collar 46 abut the ends of the sleeve at any time and outward movement of the collar is limited in another way, as will later appear. The outer end of collar 46 is shaped to fit inside spring 45 and to form a seat thereof. The inner end of the collar is adapted to abut valve 25 and hold it closed. The collar is also provided with a circumferential groove 47.

The collar 46 is movable away from valve 25 against the force of spring 45 by means of a lever including a fork and a handle. The fork comprises a central base part 48, provided at opposite sides with laterally extending trunnions 49 to fit in seats 28; two spaced arms 50 upstanding from the part 48 and having their upper ends rounded to fit within the groove 47 of collar 46 and bear against one of the annular walls of such groove; and a cylindrical stem or stud 51 which depends centrally from part 48 and has its lower end threaded. This lever is actuated by a handle part 52, one end of which has a hub 53 which is bored out to receive the stud 51. A circular diaphragm 54 of impregnated cloth or other suitable material is centrally perforated to receive stud 51 and it is clamped between the lever part 48 and the hub 53 by a nut 55, threaded on the lower end of stud 51. The outer marginal part of the diaphragm 54 is clamped against the flat face 26 of the nozzle body by a plate 56, which is secured to said body by screws 57, as shown in Fig. 8,—the plate being perforated to allow the hub 53 to pass freely therethrough with ample clearance for the necessary range of rocking movement (from the position shown in Fig. 1 to that shown in Fig. 5). It will be seen from Fig. 5 that the collar 46 is limited in its sliding movement away from valve 25 by the handle 52, the outer end of which abuts the lug 29 on the nozzle body.

It will be noted that the handle 52 when moved toward the nozzle body, will merely move the collar 46 and compress the heavy spring 45 without moving the valve 25. The plan here is to take the heavy pressure off the valve 25, leaving the latter to operate as an outwardly opening check valve, opening when the pressure of the liquid on the valve exceeds the pressure of the spring 36. This is a desirable arrangement for nozzles used in connection with gasoline pumps. Usually a separate check valve is provided in the hose nozzle and this valve is held closed under a pressure of about five pounds. When the pump is in operation, this check valve will readily open by the heavier pressure (about 15 pounds) which is built up in the discharge line. The present arrangement makes the usual nozzle valve serve also as a check valve,—this being possible by the arrangement whereby the valve opens with the liquid flow rather than against it as has been usual heretofore.

In cases where the check valve action is not needed or desired, the arrangement shown in Fig. 9 may be used. Here the collar 46' is secured to valve 25 and the spring 36 and bore 34 and stem 33 are omitted,—the collar having a stud 60 which passes through the valve and the outer end of which is headed over against the valve. This construction embodies all of the advantages of the invention, insofar as the mounting of the valve is concerned and insofar as its actuating means is concerned. The invention, in many of its features, is therefore independent of whether or not the nozzle valve is made to act as a check valve.

In operation, the valve 25 is held closed against the pressure of the liquid in the inlet passage 16 by the joint action of springs 36 and 45. When the pump is not in operation the liquid in the inlet passage is often under no pressure and, at most, there exists in such passage only a small pressure which is insufficient to overcome the force of spring 36. Therefore, if at such a time one actuates handle 52 and shifts the collar 46 to take the heavy pressure of spring 45 off the valve, the latter will not open. When the pump is in operation, the liquid in passage 16 is under a pressure greater than that exerted on valve 25 by spring 36. Consequently, if the handle 52 is then pressed toward the nozzle body, valve 25 will open by the pressure of the liquid as fast as the collar 46 is moved and to the extent of movement of the latter. The valve and collar, under such circumstances, move as if fastened together, as they may be when the check valve action is not desired.

The valve is much smoother in action than the conventional nozzle valve which opens against the liquid pressure. Here, the valve is held to its seat by the heavy valve closing spring and by the heavy liquid pressure (usually about 15 pounds per square inch). The opening of the conventional nozzle valve requires a great deal of effort and, when the valve does open and the pressure of the liquid on it is relieved, the valve is liable to be moved farther than intended by the force applied to dislodge it from its seat. The conventional nozzle valve is also liable to close suddenly and set up a hammer action in the liquid. In closing, as in opening, the conventional nozzle valve, it is difficult to just crack the valve from its seat to secure a small flow of liquid. With the present construction a more sensitive control and smoother action is secured because there need be no sudden changes in the pressures acting on the valve. Pressure on the handle 52 will oppose the force of spring 45 and may be gradually applied until the spring pressure just balances the liquid pressure. Then a slight additional pressure on the handle 52 will cause the valve to open slightly under the then superior liquid pressure. In closing the valve, the spring pressure and liquid pressure act in opposition and a gradual change in the relation of these forces may be made in a way similar to that described to secure a smooth closing without causing hammering in the liquid.

A feature of importance lies in the avoidance of the use of the conventional stuffing box and the use instead of a diaphragm, such as 54, for sealing the casing 15 where the actuating lever passes through it. The ordinary stuffing box is prone to leak and requires frequent adjustment to keep the seal tight. When the stuffing box is adjusted to prevent leakage, it presents considerable frictional resistance to movement of the valve stem. All these disadvantages are overcome by use of the diaphragm arrangement. The latter provides an effective seal of a kind which requires no adjustment and presents little resistance to movement of the actuating lever. It is to be noted that the diaphragm is not subjected to any substantial strain. The handle 52, when pressed toward the valve body causes a thrust of the trunnions in an upwardly and outwardly (toward the outlet end of passage 18) direction and this thrust is taken entirely by the trunnion seats. The actuating lever is supported entirely by the trunnions which are closely held in their seats, and the outer unclamped part of the diaphragm does not contribute in any way to the support of the lever. The central portion of the diaphragm, which is clamped between the lever parts 48 and 53 is located in the plane of the axes of the trunnions and these axes are located close to the outer clamped portion of the diaphragm. This arrangement enables the necessary movements of the actuating lever to be effected with a very small displacement of the diaphragm so that the diaphragm will not rapidly wear out.

The elimination of the usual stuffing box enables the provision of more room for the operator's hand when he grasps handle 52. In the conventional nozzle, the stuffing box projects outwardly so far (nearly to the guard) that a sharp backward offset is necessary in the valve lever and less hand room is available than with the present arrangement.

An important feature of the invention lies in the convenience with which the parts may be assembled. The valve 25 with its springs and its support and guide are inserted from the outlet end of the nozzle body. Then the gasket 42 is put in place and the nut 20, with the nozzle tube 21 inside it, is screwed into place. The screwing in of this nut tensions the valve springs and finally clamps the nozzle tube and the valve support in place. This operation may be accomplished quickly and conveniently and does not require any special skill. Thereafter, the valve lever with the diaphragm 54 and handle 52 attached, is put into place through the opening 27. The plate 54, having been previously placed on hub 53, is secured in place by the four screws 57 and the assembly is complete.

Aside from the savings in labor cost due to assembly, the construction affords other savings in manufacturing costs. The body, valve support, actuating lever and handle may be formed accurately and at low cost by die casting without requiring subsequent machining other than a few simple drilling and screw threading operations.

The invention affords a light weight nozzle which can be manufactured in quantities at much lower cost than the conventional form of nozzle now used. And the nozzle of this invention is a better article, less liable to leakage, more easily operated, smoother in operation, and more easily and conveniently handled.

What I claim is:

1. In a hose nozzle, a hollow casing having inlet and outlet passages and a valve axially movable in the outlet passage for controlling communication between said passages, said outlet passage having an interiorly screw threaded portion at its outer end and having a cylindrical bore extending from said screw threaded portion inwardly and terminating with a shoulder, a member for supporting and guiding said valve, said member having two axially-spaced interconnected ring-like parts the outer periphery of one of which engages the peripheral wall of said bore and the outer periphery of the other of which is spaced from said wall to form therewith an annular groove, the inner end of the first-named ring-like part engaging said shoulder, a tubular spout located coaxially in said screw threaded portion and having its outer periphery radially spaced from the same, said spout having an outwardly turned flange, a gasket mounted in said annular groove and interposed between said flange and ring, and an annular nut encompassing said spout and acting against said flange to press said gasket against said ring and the ring against said shoulder and to compress said gasket between said flange and ring and expand it against the wall of said bore to seal the joint between said spout and casing.

2. In a hose nozzle, a hollow casing having inlet and outlet passages and having a partition between said passages and an opening through said partition, said partition having on the outlet side thereof a valve seat surrounding said opening and located coaxially of the outlet passage, a valve for engaging said seat and slidable axially in the outlet passage, a stem fixed to said valve, a cylindrical member located coaxially of the outlet passage and having a bore to slidably receive said stem, a spring mounted in said bore and pressing against said stem to force said valve against its seat, an annular member slidably fitting the wall of the outlet passage near the outlet end thereof, spaced webs connecting said members, means for fastening the annular member in place in said outlet passage, a collar slidable on the outer peripheral part of the cylindrical member and having one end adapted to abut said valve, a spring stronger than the first-named spring and acting between said webs and the other end of said collar for forcing the valve to its seat, and means operable from outside said casing for moving said collar to compress the relatively strong spring.

3. In a hose nozzle, a hollow casing having inlet and outlet passages and a valve slidable in said casing for controlling communication between said passages, a spring tending to hold said valve in position to close off communication between said passages, a circumferentially-grooved collar slidable coaxially of said valve for compressing said spring and enabling the valve to open communication between said passages, said casing having an opening therethrough having its axis substantially normal to that of said valve and collar, U-shaped recesses in the inner wall of said opening and leading inwardly from its outer end, a lever comprising a forked part for engaging in the groove of said collar and located inside said casing, said part having trunnions projecting one from each of two opposite sides thereof and engaged one in each of said recesses, and a handle part located outside said casing, a diaphragm connected at its central portion to said lever near the axis of said trunnions and closing said opening and the outer ends of said recesses, and means for clamping the margins of said diaphragm to said casing around the edge of said opening.

4. In a hose nozzle, a hollow casing having inlet and outlet passages and having a partition between the inner ends of said passages, said partition having an opening therethrough and having on its outlet side a valve seat encompassing the opening, said outlet passage from its inner to its outer end being straight and disposed in coaxial relation with said seat, a valve cooperating with said seat and slidable axially of the outlet passage, a support for said valve mounted in the outlet passage and removable from the outlet end thereof, a spring for holding the valve to its seat, a collar through which said spring acts to move said valve, said casing having an opening therethrough leading into the outlet passage and having a pair of open-ended seats in the wall of said opening and disposed on opposite sides of the opening, a lever having at a location intermediate its ends trunnions turnably mounted one in each of said seats, said lever being engaged at one end with said collar and having the other end extending outside said casing, and a flexible diaphragm secured to the casing and closing the last-named opening and the open ends of said seats and secured to the lever at a location close to its pivotal mounting.

5. In a hose nozzle, a hollow casing having inlet and outlet pasages and having a partition between the inner ends of said passages, said partition having an opening therethrough and having on its outlet side a valve seat encompassing the opening, said outlet passage from its inner to its outer end being straight and disposed in coaxial relation with said seat, a valve cooperating with said seat and slidable axially of the outlet passage, a support for said valve mounted in the outlet passage and removable from the outlet end thereof, a spring for holding the valve to its seat, a circumferentially grooved collar through which said spring acts to move said valve, said casing having an opening therethrough leading into the outlet passage, and a lever for moving said collar to compress the valve spring; said lever comprising a fork engaging in the groove of said collar and having a stud extending outwardly beyond the last-named opening and trunnions located at the junction between the fork and stud and projecting laterally therefrom and pivotally engaged with the wall of the last-named opening, and a handle having a hub through which said stud passes, a flexible diaphragm having its central portion engaged between the fork and hub, a nut on the outer end of said stud for clamping the handle to the fork and the diaphragm between the hub and fork, and means for securing the margins of the diaphragm to said casing to close said last-named opening.

6. In combination, a hollow casing having inlet and outlet passages, a valve for controlling communication between said passages and mounted in one passage for sliding movement in the direction of the axis thereof, said casing having an opening through the wall of the last-named passage intermediate the ends thereof, the wall of said opening having in its inner surface diametrically opposed U-shaped recesses leading inwardly from the outer end of said opening, a lever having intermediate its ends trunnions projecting one from each of two opposite sides thereof and engaged one in each of said recesses, a diaphragm connected at its central portion to said lever near the axis of said trunnions and closing said opening and the outer ends of said recesses, and means for clamping the margins of said diaphragm to said casing around the edge of said opening, said lever having its inner end located inside said passage and operatively engaged with said valve for moving the same and its outer end located outside said casing.

7. A hose nozzle, comprising a hollow casing having inlet and outlet passages and a valve seat between the inner and adjacent ends of said passages, a valve cooperating with said seat for controlling communication between said passages, said valve being mounted in one passage for sliding movement in the direction of the axis thereof, a member removably mounted in the outlet end of the last-named passage for slidably supporting and guiding said valve and constituting the sole means therefor, a spring mounted between said member and valve and located in said last-named passage and acting to move said valve to its seat, said member when removed releasing said valve and spring for withdrawal from the last-named passage through the outer end thereof, said casing having a lateral opening therethrough leading into the last-named passage at a location between the inner and outer ends thereof and having a pair of open-ended seats in the wall of said opening disposed one on each side of said opening, a valve operating lever having trunnions removably and turnably mounted one in each of said seats, said lever having a part extending through said opening into the last-named passage and operatively engaged with said valve, and means for closing and sealing said opening and holding said trunnions in their seats, said lever being removable on disconnection of said sealing means by withdrawing it through said opening in a direction substantially normal to the axis of said last-named passage.

WARREN H. DE LANCEY.